United States Patent
Chen

(10) Patent No.: US 6,659,379 B2
(45) Date of Patent: Dec. 9, 2003

(54) PEPPER GRINDER

(76) Inventor: Wen-shou Chen, No. 18, Alley 28, Lane 103, Yen Cheng Rd., Tainan (TW)

(*) Notice: Subject to any disclaimer, the term of this patent is extended or adjusted under 35 U.S.C. 154(b) by 0 days.

(21) Appl. No.: 09/955,991

(22) Filed: Sep. 20, 2001

(65) Prior Publication Data

US 2002/0092940 A1 Jul. 18, 2002

(30) Foreign Application Priority Data

Jan. 18, 2001 (TW) ...................................... 90200960 U

(51) Int. Cl.⁷ ................................................ A47J 42/04
(52) U.S. Cl. .................................................. 241/169.1
(58) Field of Search ............................... 241/168, 169.1

(56) References Cited

U.S. PATENT DOCUMENTS

| | | | |
|---|---|---|---|
| 3,136,491 A | * 6/1964 | Posmanter | 241/169.1 |
| 4,139,161 A | * 2/1979 | Hupperich | 241/162 |
| 4,632,322 A | * 12/1986 | Beilstein | 222/142.7 |
| 4,960,246 A | * 10/1990 | Fohrman | 241/169.1 |
| 5,785,264 A | * 7/1998 | Yang | 241/169.1 |

* cited by examiner

Primary Examiner—Mark Rosenbaum
(74) Attorney, Agent, or Firm—Rosenberg, Klein & Lee

(57) ABSTRACT

A pepper grinder comprises a revolving cylinder having its upper opening provided with a cap and its lower opening end inserted into a cylinder wherein a grinding toothed quadrant is provided. Two recesses are provided in symmetrical sides at the bottom and a groove provided on the external surface of the revolving cylinder, A gradation is formed at the top edge of a fluted surface inside the lower part of the cylinder and a fixation ring is inserted into a ring groove disposed above the gradation. The revolving cylinder is connected to the grinding toothed quadrant to become an integral part with the cylinder. The bottom of the revolving cylinder holds against the gradation and the fixation ring is inserted into the groove with the grinding toothed quadrant placed inside the fluted surface. The grinding toothed quadrant rotates within the fluted surface as directly driven by the rotation of the revolving cylinder with the positioning piece.

2 Claims, 4 Drawing Sheets

PEPPER GRINDER

BACKGROUND OF THE INVENTION

(a) Field of the Invention

The present invention relates to a pepper grinder, and more particularly to one that a grinding toothed quadrant is directly driven by a revolving cylinder to revolve in relation to a fluted internal surface without using a shaft to penetrate and connect both of a revolving cylinder and a cylinder.

(b) Description of the Prior Art

Whereas, using of seasoning has significant impacts upon the favor of food. Containers used for various types of seasonings are not necessarily identical. Seasonings may be processed into different sizes and/or shapes. Taking the pepper for instance, generally it is ground into powder for the user to add into the food as desired. However, in certain occasion when the preserving of original flavor of the pepper is emphasized, pepper in larger grain is stored in a grinder and then is only ground into finer powder when required. The prior art of the pepper grinder generally available in the market is essentially comprised of an upper cylinder and a lower cylinder with pepper grains filled up inside, and a shaft penetrating through and connecting both said cylinders to the base of the lower cylinder. Within, a tapered toothed quadrant is connected to the lower end of the shaft and a fluted structure is provided at the base in the lower cylinder at a proper range in relation to the tapered toothed quadrant. By rotating the upper cylinder, the shaft is driven to rotate the tapered toothed quadrant against the fluted structure inside the lower cylinder to grind the pepper into finer powder to fall upon the food.

However, the design of such a shaft restricts smooth operation of the grinder and is not yet perfect.

SUMMARY OF THE INVENTION

The primary purpose of the present invention is to provide a pepper grinder by having a revolving cylinder of the upper part to connect a grinding toothed quadrant to become an integral part with a cylinder of the lower part for the revolving cylinder to directly drive a fluted internal surface at the base inside the cylinder where accommodating the grinding toothed quadrant to rotate without relying upon a shaft to penetrate and connect both of said revolving cylinder and the cylinder.

To achieve the purpose, two recesses are formed on symmetrical sides at the bottom of the revolving cylinder and a groove is provided around the base on the outer surface of the cylinder. A cap is provided at the top of the open end of the revolving cylinder. A positioning piece is fixed at the top of the grinding toothed quadrant with its both ends to be inserted into those two recesses at the bottom of the revolving cylinder. The lower part inside the cylinder is fluted with a gradation provided at the top edge of the fluted surface and a ring groove formed above the gradation. Therefore, the lower part of the revolving is inserted into the cylinder by engaging the grinding toothed quadrant and is restricted by the gradation inside the cylinder. The revolving cylinder further is held in position by inserting a fixation ring into the groove with said grinding toothed quadrant penetrating against the fluted surface. By turning the revolving cylinder, the grinding toothed quadrant can be directly driven by the positioning piece to rotate the quadrant around the fluted surface to grind the pepper.

DETAILED DESCRIPTION OF THE PREFERRED EMBODIMENTS

Figure 1:
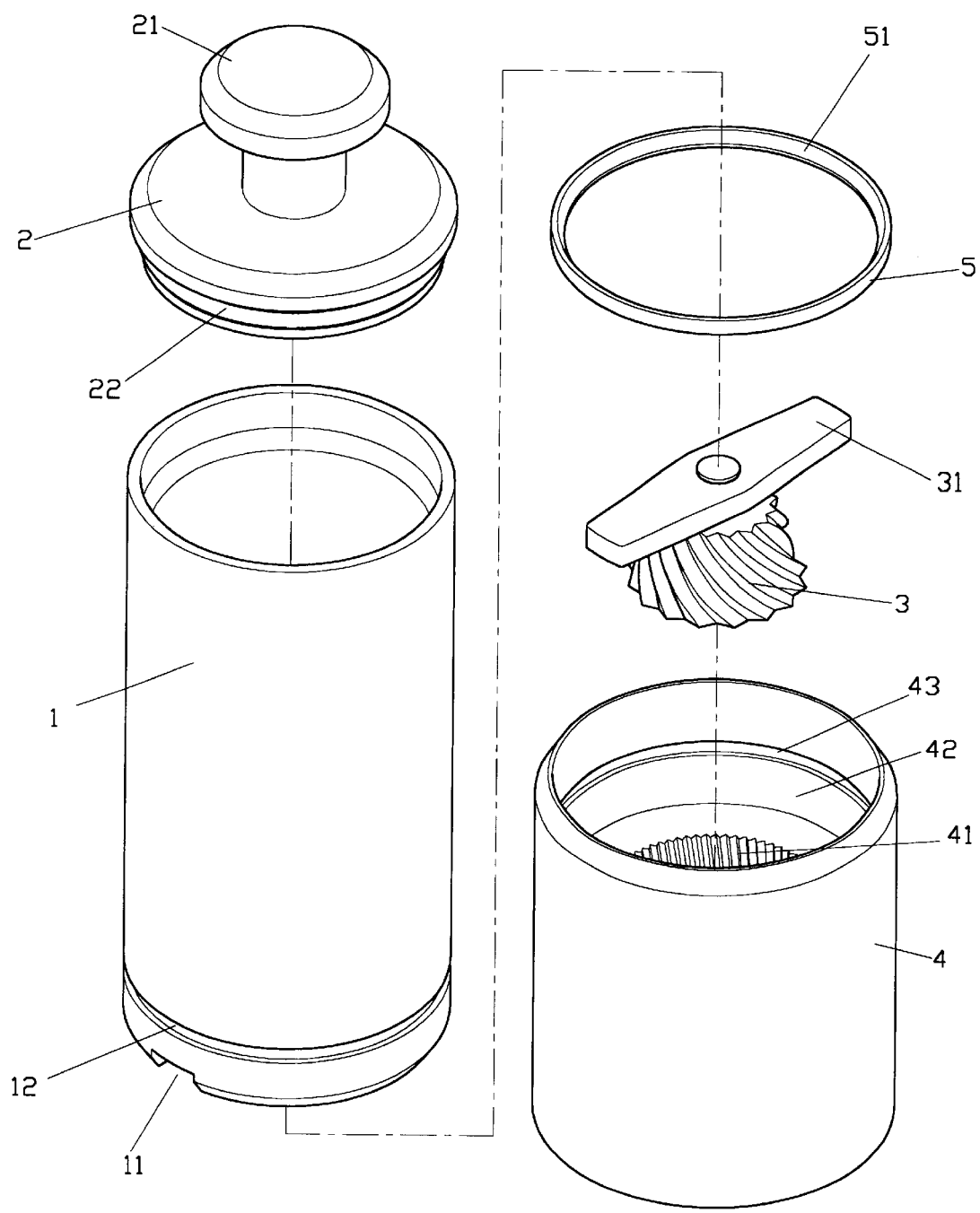
FIG. 1 is an exploded view of a preferred embodiment of the present invention.

Referring to FIG. 1, a pepper grinder of the present invention comprises a revolving cylinder (1), a cap (2), a grinding toothed quadrant (3), a cylinder (4) and a retainer ring (5). Two recesses (11) are formed at both symmetrical sides at the lower open end and a ring groove (12) is formed around the outer surface at the lower part of the revolving cylinder (1) while the upper end of the revolving cylinder (1) receives the cap (2).

A handle (21) is provided at the top of the cap (2) and a resilient ring (22) is provided around the flange at the base of the cap (2).

A positioning piece (31) is fixed at the top of the grinding toothed quadrant (3) allowing both ends of the positioning piece (31) respectively inserted into the two recesses (11) at the bottom of the revolving cylinder (1).

The internal surface of the cylinder (4) is fluted. A gradation (42) provided at the circumference over a fluted surface (41) is provided with a groove (43) over the gradation (42) to accommodate the fixation ring (5).

The inner part of the fixation ring (5) has a slanted convex (51).

Figure 2:
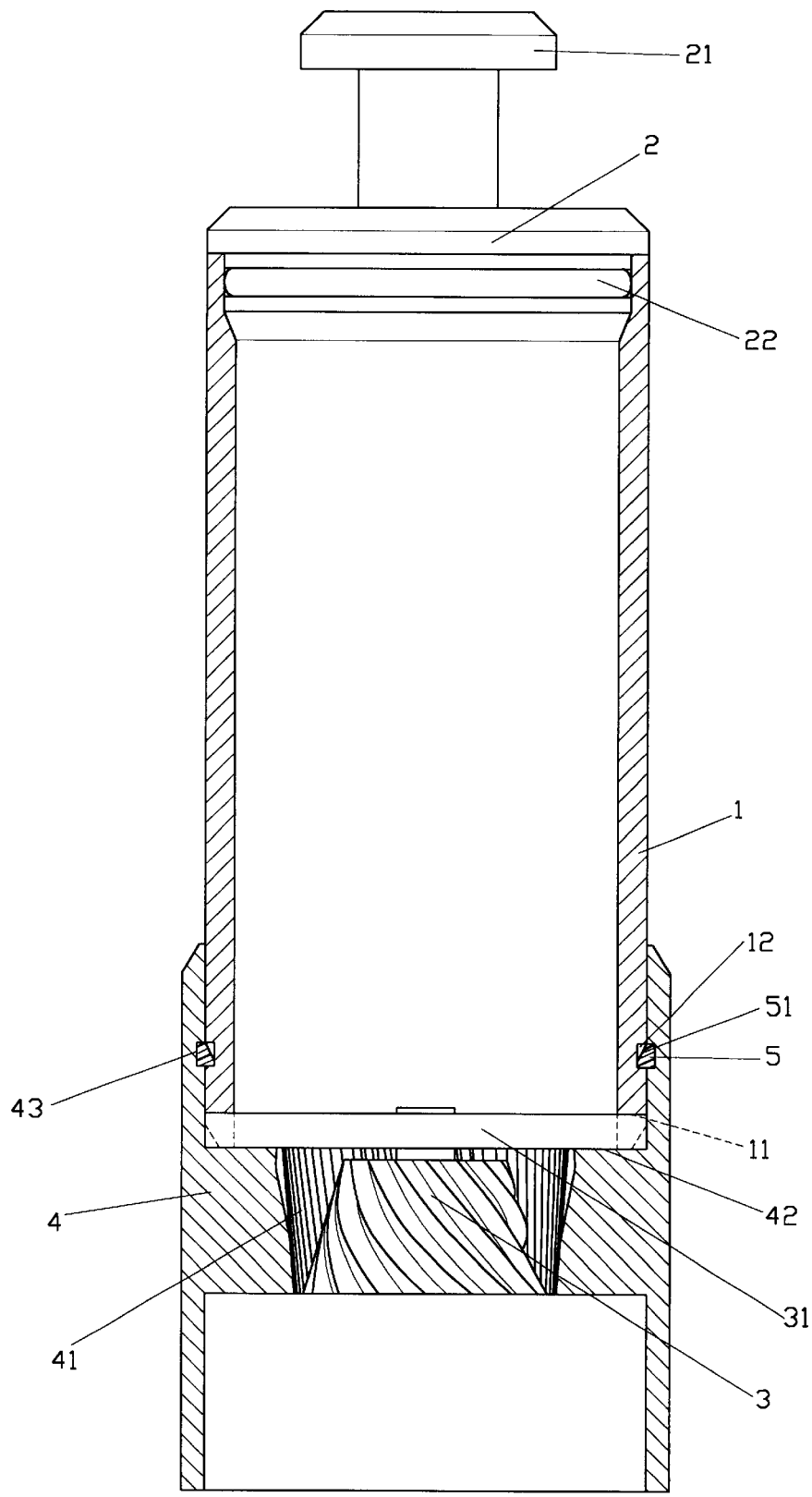
FIG. 2 is a sectional view of the preferred embodiment of the present invention as assembled.
Figure 3:
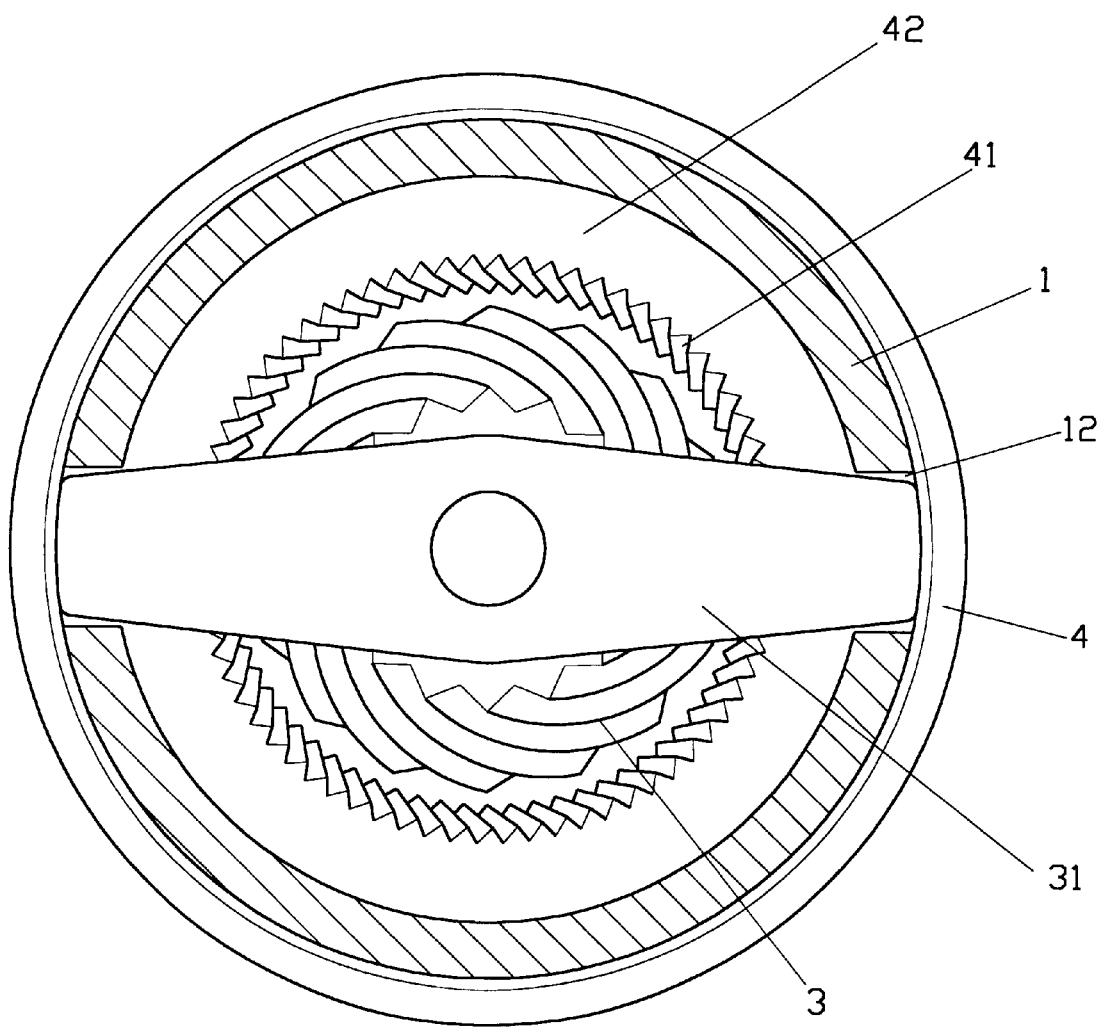
FIG. 3 is another sectional view of the preferred embodiment of the present invention as assembled.

As illustrated in FIGS. 2 and 3, both ends of the positioning piece (31) at the top of the grinding toothed quadrant (3) are inserted into the two recesses (11) of the revolving cylinder (1) so to from an integral part. Then the revolving cylinder (1) is inserted into the cylinder (4) and has its bottom restricted by the gradation (42) of the cylinder (4). The slanted convex (51) of the fixation ring (5) inside the upper groove (43) of the cylinder (4) is used to facilitate the cylinder (4) to slide in and engage the ring groove (12) on the revolving cylinder (1). The revolving cylinder (1) is held against where the grinding toothed quadrant (3) of the gradation (42) inside the cylinder (4) extends onto the fluted surface (41) with the positioning piece (31). The cap (2) completely covers up the revolving cylinder (1) by having the flange of the resilient ring (22) provided at its base to directly match the open upper end of the revolving cylinder (1). The cap (2) also can be freely and independently opened up.

Figure 4:
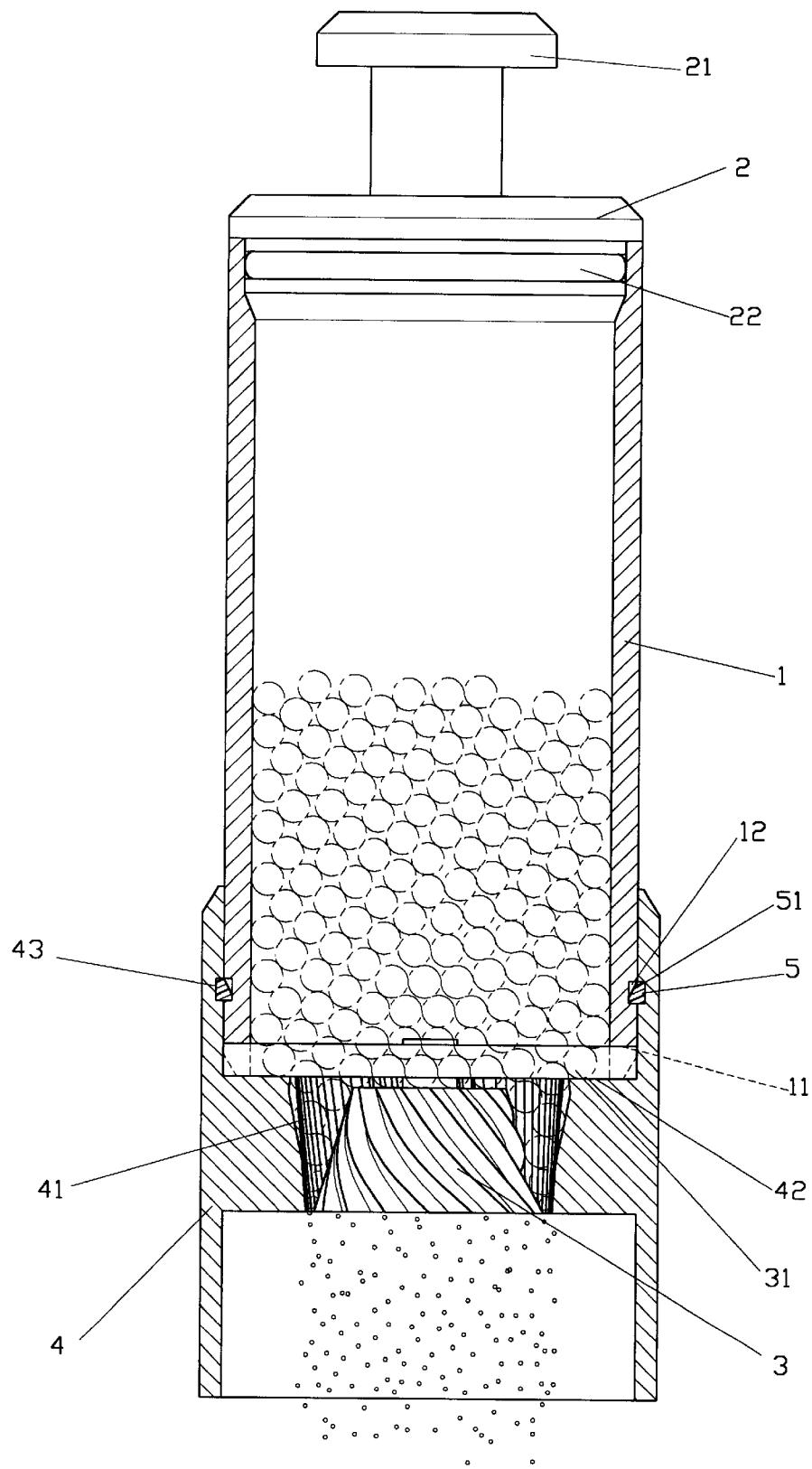
FIG. 4 is a schematic view of the preferred embodiment of the present invention in use.

Furthermore, the revolving cylinder (1) can be turned around by holding the cylinder (4) so to lead the grinding toothed quadrant (3) to forthwith turn around in relation to the fluted internal surface (41) of the cylinder (4) due to the engagement between the recesses (11) of the revolving cylinder (1) and the positioning piece (31) as illustrated in FIG. 4. Pepper then is ground into powder to fall out of the cylinder (4) by passing between the grinding toothed quadrant (3) and the fluted surface (41). Depending on the personal like and dislike, the size of the resultant pepper processed with the present invention. If the revolving cylinder (1) rotates by compromising the rotating direction of the grinding toothed quadrant (3), the resultant pepper powder is finer as it is ground. On the contrary, if the revolving cylinder (1) rotates in the opposite direction to that by the grinding toothed quadrant (3), the resultant pepper indicates grain shape since it is cracked.

The pepper grinder features simplified design of components and easy assembly by having the revolving cylinder of the upper part of the grinder to directly join the grinding toothed quadrant provided in the cylinder of the lower part of the grinder without using a shaft to penetrate through both of the revolving cylinder and the cylinder. The cap provided at the upper end of the revolving cylinder allows easy open up to place into the pepper without being restricted by a linkage, i.e. a shaft, connected to the grinding toothed quadrant. The preferred embodiment of the present invention as disclosed is innovative, compact and practical to achieve significant improvement of the prior art.

I claim:

1. A pepper grinder comprising a revolving cylinder, a grinding toothed quadrant, a cylinder, a fixation ring, and a cap, the revolving cylinder having an upper opening and a lower opening;

the cap provided at the upper opening of the revolving cylinder, the lower opening coupled to the cylinder, the grinding toothed quadrant disposed inside the cylinder, the cylinder having an internal fluted surface in relation to the grinding toothed quadrant, the revolving cylinder having two opposed recesses at its bottom and a ring groove around its external surface, the grinding toothed quadrant having a top portion fixed to a positioning piece, the positioning piece having ends engaging the recesses at the bottom of the revolving cylinder, the cylinder having a gradation formed at a top edge of the internal fluted surface, and a groove disposed adjacent the gradation, the fixation ring being inserted into the groove, the revolving cylinder being incorporated with the cylinder to capture the grinding toothed quadrant therebetween, the revolving cylinder having its lower end restricted by the gradation and connected with the fixation ring inserted into the groove; and the grinding toothed quadrant being driven by the revolving cylinder through the engagement of the recesses and the positioning piece.

2. The pepper grinder as claimed in claim 1, wherein said fixation ring includes a slanted convex portion formed therein.

* * * * *